US010785436B1

(12) United States Patent
Lim

(10) Patent No.: US 10,785,436 B1
(45) Date of Patent: Sep. 22, 2020

(54) IMAGE SENSOR AND TRANSFER CIRCUIT AND TRANSFER METHOD THEREOF

(71) Applicant: PixArt Imaging Incorporation, HsinChu (TW)

(72) Inventor: Wooi-Kip Lim, Penang (MY)

(73) Assignee: PIXART IMAGING INCORPORATION, Hsinchu (TW)

( * ) Notice: Subject to any disclaimer, the term of this patent is extended or adjusted under 35 U.S.C. 154(b) by 0 days.

(21) Appl. No.: 16/568,203

(22) Filed: Sep. 11, 2019

(51) Int. Cl.
*H04N 5/341* (2011.01)
*H04N 5/3745* (2011.01)
*H04N 5/378* (2011.01)
*H04N 5/376* (2011.01)

(52) U.S. Cl.
CPC ......... *H04N 5/37455* (2013.01); *H04N 5/378* (2013.01); *H04N 5/3765* (2013.01)

(58) Field of Classification Search
CPC ...................................................... H04N 5/341
See application file for complete search history.

(56) References Cited

U.S. PATENT DOCUMENTS

| 9,077,918 | B2* | 7/2015 | Hiyama | H01L 27/14603 |
| 9,648,257 | B2* | 5/2017 | Bosset | H04N 5/341 |
| 2010/0110216 | A1* | 5/2010 | Nishihara | H04N 5/341 348/222.1 |
| 2015/0326811 | A1* | 11/2015 | Nishida | H04N 5/378 348/308 |
| 2018/0007304 | A1* | 1/2018 | Sakakibara | G01S 17/894 |
| 2018/0274975 | A1* | 9/2018 | Panicacci | G01J 1/4228 |
| 2019/0007634 | A1* | 1/2019 | Shimizu | H04N 5/3698 |

* cited by examiner

*Primary Examiner* — Paulos M Natnael
(74) *Attorney, Agent, or Firm* — Tung & Associates

(57) ABSTRACT

An image sensor for capturing an image, includes: an array of pixel circuits, wherein each of the pixel circuits is for sensing a portion of the image, and generate a sample signal and a hold signal according to the portion of the image and a predetermined reset voltage respectively; and a transfer circuit, which is coupled to the array, and is for converting the sample signals and hold signals to corresponding digital sensing signals and corresponding digital reset signals respectively, to generate pixel signals respectively corresponding to the pixel circuits according to the digital sensing signals and the digital reset signals; wherein the transfer circuit converts the sample signal generated by one of the pixel circuits to the corresponding digital sensing signal and converts the hold signal generated by another one of the pixel circuits to the corresponding digital reset signal at least partially within a same period.

19 Claims, 5 Drawing Sheets

IMAGE SENSOR AND TRANSFER CIRCUIT AND TRANSFER METHOD THEREOF

BACKGROUND OF THE INVENTION

Field of Invention

The present invention relates to an image sensor; particularly, it relates to such image sensor which has a shortened pixel transfer time. The present invention also relates to a transfer circuit and a transfer method of the image sensor.

Description of Related Art

FIG. 1A shows a schematic diagram of a prior art image sensor (image sensor 1) for capturing an image. The image sensor 1 includes an array 10 of pixel circuits 101 and a transfer circuit 20. The array 10 includes plural pixel circuits 101 arranged in rows and columns. In one display frame, the rows are scanned in a sequential order of the rows, for example, from Row 1 to Row m in the number order. When one row of the array 10 is selected, each of the pixel circuits 101 in the selected row senses a portion of the image and receives a predetermined reset voltage, to generate a sample signal and a hold signal according to the portion signal and the predetermined reset voltage respectively, in a sequential order of the columns, for example, from Col. 1 to Col. n the number order.

The pixel circuit 101 generates the sample signal at output pins OUT1 and OUT2 for cancelling differential and common mode noises, which is known to a person having ordinary skill in the art, so the details thereof are not redundantly explained here. The pixel circuit 101 also generates the hold signal via output pins OUT1 and OUT2 for cancelling the differential and common mode noises.

The transfer circuit 20 includes a multiplexer (MUX) 21, a two phase sampling (TA) circuit 22, an analog-to-digital conversion (ADC) circuit 23, and a digital processing circuit 24. The MUX 21 selects the sample signal and the hold signal from the corresponding pixel circuit 101, and transfers the corresponding sample signal and the hold signal to the two phase sampling (TA) circuit 22. As shown in FIG. 1B, which is a schematic time chart showing that, the TA circuit 22 receives the sample signal in a sample period, and the hold signal in a hold period, one pixel circuit 101 by one pixel circuit 101 in turn. After the sample signal and the hold signal are received, the TA circuit 22 performs a subtraction of the sample signal and the hold signal, and generates the difference between the sample signal and the hold signal to the ADC circuit 23. The ADC circuit 23 receives the difference between the sample signal and the hold signal, and converts the difference to a digital signal. The digital processing circuit 24 receives the digital signal to generate a pixel signal as shown in FIG. 1A.

The prior art image sensor 1 shown in FIGS. 1A and 1B has a drawback that the transfer circuit 20 receives the sample signal and the hold signal in non-overlapped different periods. As thus, the pixel transfer time is long, i.e., the frame rate of the image sensor 1 is limited. Note that the pixel transfer time indicates a time period which starts from the transfer circuit 20 selecting the sample signal and the hold signal of the corresponding pixel circuit 101 to generating the corresponding pixel signal.

Compared to the prior art shown in FIGS. 1A and 1B, the present invention is advantageous in that, a transfer circuit according to the present invention converts the sample signal generated by one of the pixel circuits to a corresponding digital sensing signal and converts the hold signal generated by another one of the pixel circuits to a corresponding digital reset signal at least partially within a same period, which can effectively reduce the pixel transfer time.

SUMMARY OF THE INVENTION

From one perspective, the present invention provides an image sensor, configured to operably capture an image, the image sensor comprising: an array of pixel circuits, wherein each of the pixel circuits is configured to operably sense a portion of the image, and generate a sample signal and a hold signal according to the portion of the image and a predetermined reset voltage respectively; and a transfer circuit, which is coupled to the array of the pixel circuits, and is configured to operably convert the sample signals and hold signals generated by the pixel circuits to corresponding digital sensing signals and corresponding digital reset signals, respectively, and to generate pixel signals respectively corresponding to the pixel circuits according to the digital sensing signals and the digital reset signals; wherein the transfer circuit converts the sample signal generated by one of the pixel circuits to the corresponding digital sensing signal and converts the hold signal generated by another one of the pixel circuits to the corresponding digital reset signal at least partially within a same period.

In one preferable embodiment, the transfer circuit includes: a sensing analog-to-digital conversion(ADC) circuit, which is coupled to the array of the pixel circuits, and is configured to operably convert the sample signal to the digital sensing signal in a sample period; a reset analog-to-digital conversion(ADC) circuit, which is coupled to the array of the pixel circuits, and is configured to operably convert the hold signal to the digital reset signal in a hold period; and a digital processing circuit, which is coupled to the reset ADC circuit and the sensing ADC circuit, and is configured to operably generate the pixel signal according to the digital sensing signal and the digital reset signal.

In one preferable embodiment, the array of the pixel circuits are arranged in plural rows and columns; wherein the sensing ADC circuit converts the sample signals to the digital sensing signals in a sequential order of the columns when the corresponding row is selected; wherein the reset ADC circuit converts the hold signals to the digital reset signals in the sequential order of the columns when the corresponding row is selected.

In one preferable embodiment, the reset ADC circuit has a reset range and a reset resolution, and the sensing ADC circuit has a sensing range and a sensing resolution, wherein the reset range is less than the sensing range, and the reset resolution is not less than the sensing resolution.

In one preferable embodiment, the reset ADC circuit includes a plurality of comparators, wherein the plural comparators are configured to operably convert the hold signal to the digital reset signal, wherein a number of the comparators is corresponding to the reset range and/or the reset resolution.

In one preferable embodiment, the number of the comparators is not larger than 20.

In one preferable embodiment, the digital processing circuit performs a subtraction operation on the digital sensing signal and the corresponding digital reset signal to generate the pixel signal.

In one preferable embodiment, the pixel circuit includes: a sensor device, which is configured to operably sense the portion of the image and generate a light sensing signal; a storage device, which is coupled to the sensor device, and is configured to operably store the light sensing signal and the predetermined reset voltage; and an amplification circuit, which is coupled to the sensor device and the storage device, and is configured to operably generate the sample signal and the hold signal according to the light sensing signal and the predetermined reset voltage respectively.

From another perspective, the present invention provides a transfer circuit, which is coupled to an array of pixel circuits, wherein each of the pixel circuits is configured to operably sense a portion of an image, and generate a sample signal and a hold signal according to the portion of the image and a predetermined reset voltage respectively; the transfer circuit comprising: a sensing analog-to-digital conversion (ADC) circuit, which is coupled to the array of the pixel circuits, and is configured to operably convert the sample signal to a digital sensing signal in a sample period; a reset analog-to-digital conversion(ADC) circuit, which is coupled to the array of the pixel circuits, and is configured to operably convert the hold signal to a digital reset signal in a hold period; and a digital processing circuit, which is coupled to the reset ADC circuit and the sensing ADC circuit, and is configured to operably generate the pixel signal according to the digital sensing signal and the digital reset signal; wherein the sensing ADC circuit converts the sample signal generated by one of the pixel circuits to the corresponding digital sensing signal and the reset ADC circuit converts the hold signal generated by another one of the pixel circuits to the corresponding digital reset signal at least partially within a same period.

From another perspective, the present invention provides a transfer method of an image sensor, wherein the image sensor is configured to operably capture an image, and includes an array of pixel circuits and a transfer circuit; the transfer method comprising: sensing a portion of the image by each of the pixel circuits; generating a sample signal and a hold signal according to the portion of the image and a predetermined reset voltage respectively; converting the sample signals and hold signals generated by the pixel circuits to corresponding digital sensing signals and corresponding digital reset signals, respectively by the transfer circuit; and generating pixel signals respectively corresponding to the pixel circuits according to the digital sensing signals and the digital reset signals; wherein the transfer circuit converts the sample signal generated by one of the pixel circuits to the corresponding digital sensing signal and converts the hold signal generated by another one of the pixel circuits to the corresponding digital reset signal at least partially within a same period.

In one preferable embodiment, the step of converting the sample signals and hold signals generated by the pixel circuits to corresponding digital sensing signals and corresponding digital reset signals, respectively by the transfer circuit includes: converting the sample signal to a digital sensing signal in a sample period; converting the hold signal to a digital reset signal in a hold period; and generating the pixel signal according to the digital sensing signal and the digital reset signal.

In one preferable embodiment, wherein the array of the pixel circuits are arranged in plural rows and columns; wherein the step of converting the sample signals to the digital sensing signals is performed in a sequential order of the columns when the corresponding row is selected; wherein the step of converting the hold signals to the digital reset signals is performed in the sequential order of the columns when the corresponding row is selected.

In one preferable embodiment, the digital reset signal includes a reset range and a reset resolution, and the digital sensing signal includes a sensing range and a sensing resolution, wherein the reset range is less than the sensing range, and the reset resolution is not less than the sensing resolution.

In one preferable embodiment, the step of generating the pixel signal according to the digital sensing signal and the digital reset signal includes: performing a subtraction operation on the digital sensing signal and the digital reset signal to generate the pixel signal.

In one preferable embodiment, the pixel circuit includes: a sensor device, which is configured to operably sense the portion of the image and generate a light sensing signal; a storage device, which is coupled to the sensor device, and is configured to operably store the light sensing signal in a sample period and the predetermined reset voltage in the hold period; and an amplification circuit, which is coupled to the sensor device and the storage device, and is configured to operably generate the sample signal and the hold signal according to the light sensing signal and the predetermined reset voltage respectively.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signals, but not drawn according to actual scale.

Figure 2A:
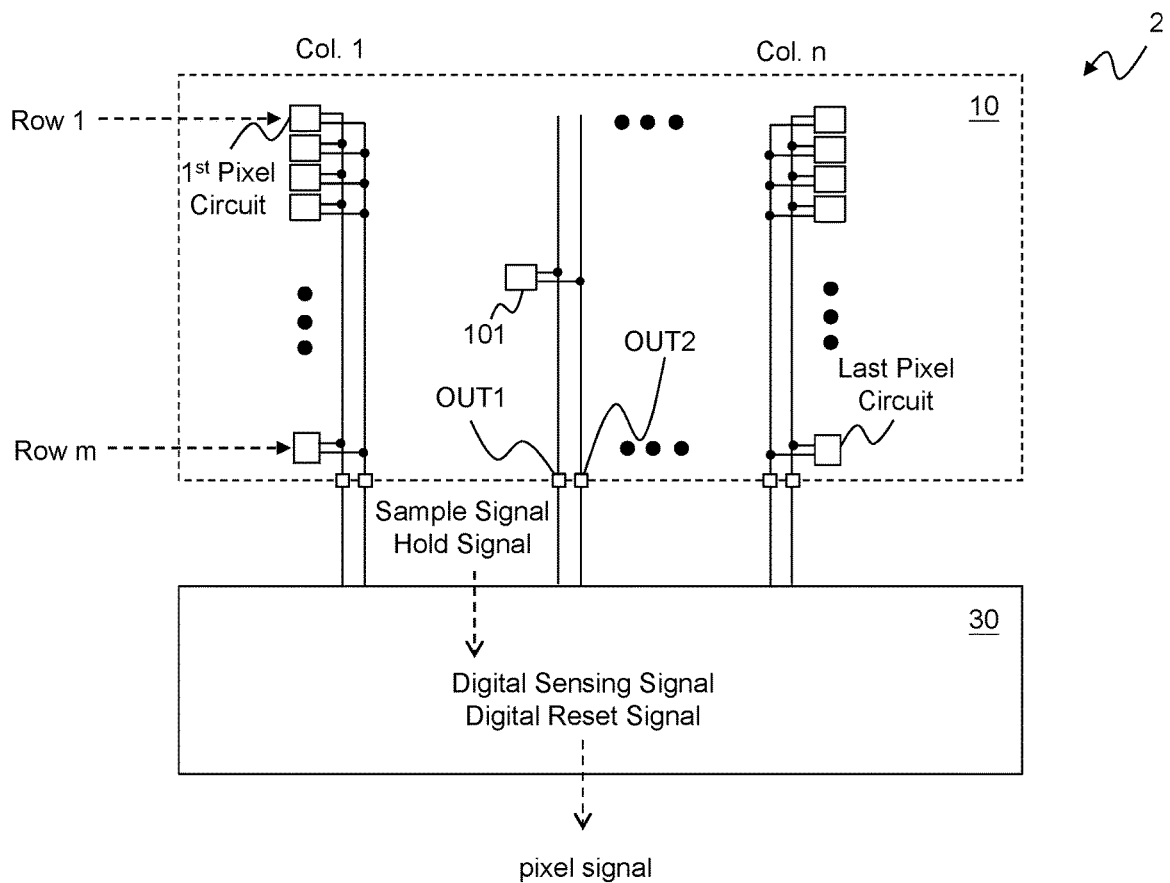
FIGS. 2A and 2B show schematic diagrams of a first embodiment according to the present invention.
Figure 2B:
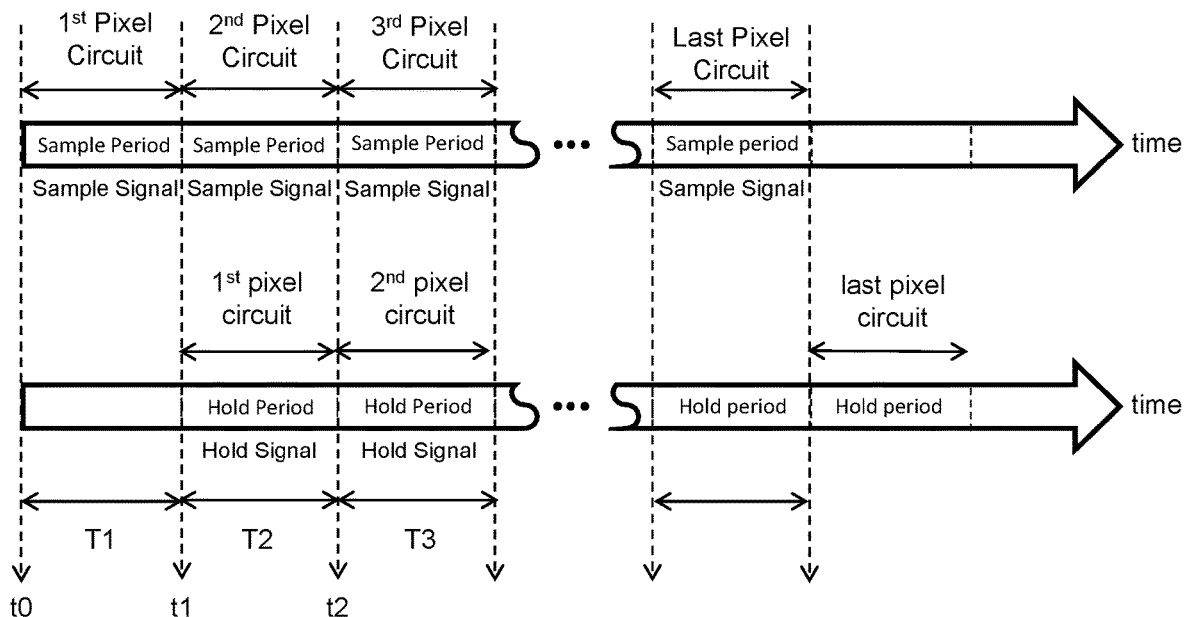

FIGS. 2A and 2B show schematic diagrams of a first embodiment according to the present invention. As shown in FIG. 2A, an image sensor (image sensor 2) is configured to operably capture an image, and includes an array 10 of pixel circuits 101 and a transfer circuit 30. As shown in FIG. 2A, the array 10 includes plural pixel circuits 101, wherein the plural pixel circuits 101 are arranged in rows and columns. Each of the pixel circuits 101 is configured to operably sense a portion of the image, and generate a sample signal and a hold signal according to the portion of the image and a predetermined reset voltage respectively. In one display frame, the rows are scanned in a sequential order of the rows, for example, from Row 1 to Row m in the number order. When one row of the array 10 is selected, each of the pixel circuits 101 in the selected row senses a portion of the image and receives the predetermined reset voltage, to generate the sample signal and the hold signal according to the portion signal and the predetermined reset voltage respectively, in a sequential order of the columns, for example, from Col. 1 to Col. n in the number order. Note that both m and n are positive integers.

The pixel circuit 101 generates the sample signal simultaneously at output pins OUT1 and OUT2 in one period for cancelling differential and common mode noises, which is known to a person having ordinary skill in the art, so the details thereof are not redundantly explained here. The pixel circuit 101 also generates the hold signal via output pins OUT1 and OUT2 simultaneously in another period, for cancelling differential and common mode noises.

The transfer circuit 30 is coupled to the array 10 of the pixel circuits 101, and is configured to operably convert the sample signals and hold signals generated by the pixel circuits 101 to corresponding digital sensing signals and corresponding digital reset signals, respectively, and to generate pixel signals corresponding to the respective pixel circuits 101 according to the digital sensing signals and the digital reset signals.

According to the present invention, the transfer circuit 30 converts the sample signal generated by one of the pixel circuits 101 to the corresponding digital sensing signal and converts the hold signal generated by another one of the pixel circuits 101 to a corresponding digital reset signal at least partially within a same period.

As shown in FIG. 2B, which is a schematic time chart showing that the transfer circuit 30 receives the sample signal in a corresponding sample period, and the hold signal in a corresponding hold period. Different from the prior art transfer circuit 20, the transfer circuit 30 according to the present invention does not receive the sample signal and the hold signal one pixel circuit 101 by one pixel circuit 101 in turn (in separated time periods), but receives the sample signal generated by one of the pixel circuits 101 and the hold signal generated by another one of the pixel circuits 101 at least partially within a same period.

For example, as shown in FIG. 2B, the transfer circuit 30 receives the sample signal of the first pixel circuit 101 in the sample period (a first period T1) which is from time point t0 to time point t1; and the transfer circuit 30 receives the hold signal of the first pixel circuit 101 in the hold period (a second period T2) which is from time point t1 to time point t2. In the second period T2, the transfer circuit 30 also receives the sample signal of the second pixel circuit 101. As thus, the transfer circuit 30 receives the sample signal generated by the second pixel circuit 101 and receives the hold signal generated by the first pixel circuit 101 within the same second period T2. And then, the transfer circuit 30 receives the sample signal generated by the third pixel circuit 101 and receives the hold signal generated by the second pixel circuit 101 within a same third period T3, and so on. As a result, the pixel transfer time is shortened compared to the prior art transfer circuit 20, i.e., the frame rate of the image sensor 2 is increased compared to the prior art image sensor 1.

As shown in FIGS. 2A and 2B, the pixel transfer time of the first embodiment according to the present invention is about half of the pixel transfer time of the prior art image sensor 1. As thus, the frame rate of the image sensor 2 is about doubled compared to the prior art image sensor 1. Note that, in the second period T2, the transfer circuit 30 not only receives the sample signal generated by the second pixel circuit 101 and receives the hold signal generated by the first pixel circuit 101, but also converts the sample signal and the hold signal both generated by the first pixel circuit 101 to a first pixel signal. In other words, in one preferable embodiment, the transfer circuit 30 converts the sample signal to the digital sensing and converts the hold signal to the digital reset signal simultaneously, wherein the sample signal and the hold signal are generated by different pixel circuits 101.

After the sample signal and the hold signal of the same pixel circuit 101 are received, the transfer circuit 30 performs a subtraction of the sample signal and the hold signal, and generates the difference between the sample signal and the hold signal. The transfer circuit 30 then converts the difference between the sample signal and the hold signal to generate a pixel signal of the corresponding pixel circuit 101.

Figure 3:
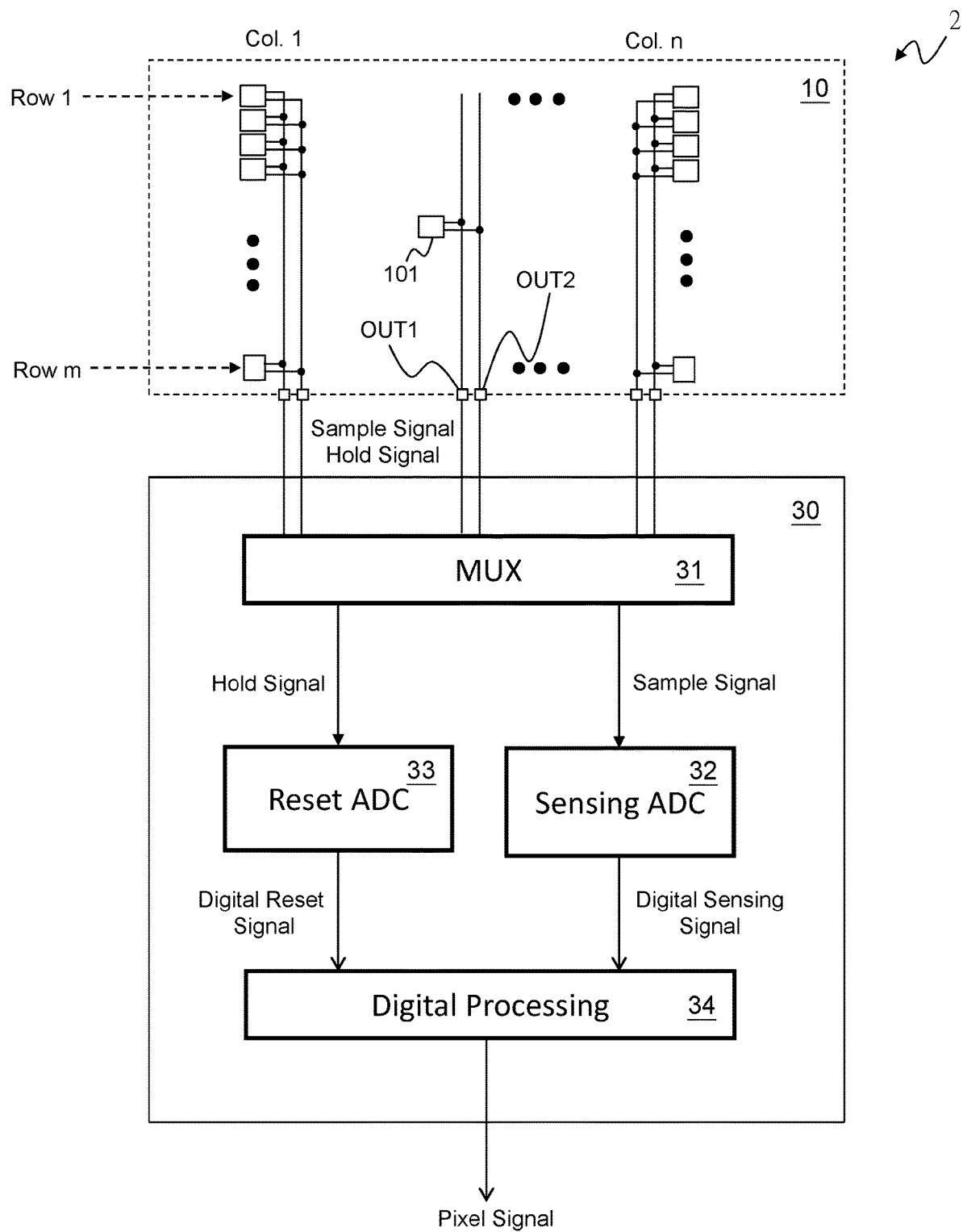
FIG. 3 shows a schematic diagram of a second embodiment according to the present invention.

FIG. 3 shows a schematic diagram of a second embodiment according to the present invention. As shown in FIG. 3, the transfer circuit 30 includes a multiplexer (MUX) 31, a sensing analog-to-digital conversion (ADC) circuit 32, a reset analog-to-digital conversion (ADC) circuit 33, and a digital processing circuit 34.

The MUX 31 selects the sample signal and the hold signal from the corresponding pixel circuit 101, and transfers the corresponding sample signal and the hold signal to the sensing ADC circuit 32 and reset ADC circuit 33 respectively. The sensing ADC circuit 32 is coupled to the array 10 of the pixel circuits 101, and is configured to operably convert the sample signal to the digital sensing signal in the corresponding sample period. The reset ADC circuit 33 is coupled to the array 10 of the pixel circuits 101, and is configured to operably convert the hold signal to the digital reset signal in the corresponding hold period. The digital processing circuit 34 is coupled to the reset ADC circuit 33 and the sensing ADC circuit 32, and is configured to operably generate the pixel signal according to the digital sensing signal and the digital reset signal.

In one preferable embodiment, the pixel circuits 101 are arranged in plural rows and columns, for example Row 1 to Row m and Col. 1 to Col. n respectively; wherein the m and n are both positive integers. The sensing ADC circuit 32 converts the sample signals to the digital sensing signals in a sequential order of the columns, for example Col. 1 to Col. n in the number order, when the corresponding row is selected. The reset ADC circuit 33 converts the hold signals to the digital reset signals in the sequential order of the columns, for example Col. 1 to Col. n in the number order, when the corresponding row is selected.

In one preferable embodiment, the reset ADC circuit 33 has a reset range and a reset resolution, and the sensing ADC circuit 32 has a sensing range and a sensing resolution, wherein the reset range is less than the sensing range, and the reset resolution is not less than the sensing resolution. For example, the reset resolution, such as 20 mV/LSB, is equal to or higher than the sensing resolution. As thus, the reset ADC circuit 33 can convert the hold signal to the digital reset signal with the reset range smaller than the sensing range, because variation of the hold signal is much smaller than variation of the sample signal. Therefore, the reset ADC circuit 33 may consist of plural comparators instead of an expensive ADC circuit as the sensing ADC circuit 32.

The digital processing circuit 34 is coupled to the reset ADC circuit and the sensing ADC circuit, and is configured to operably generate the pixel signal according to the digital sensing signal and the digital reset signal. In a preferable embodiment, the digital processing circuit 34 performs a subtraction operation on the digital sensing signal and the digital reset signal to generate the pixel signal.

Figure 4:
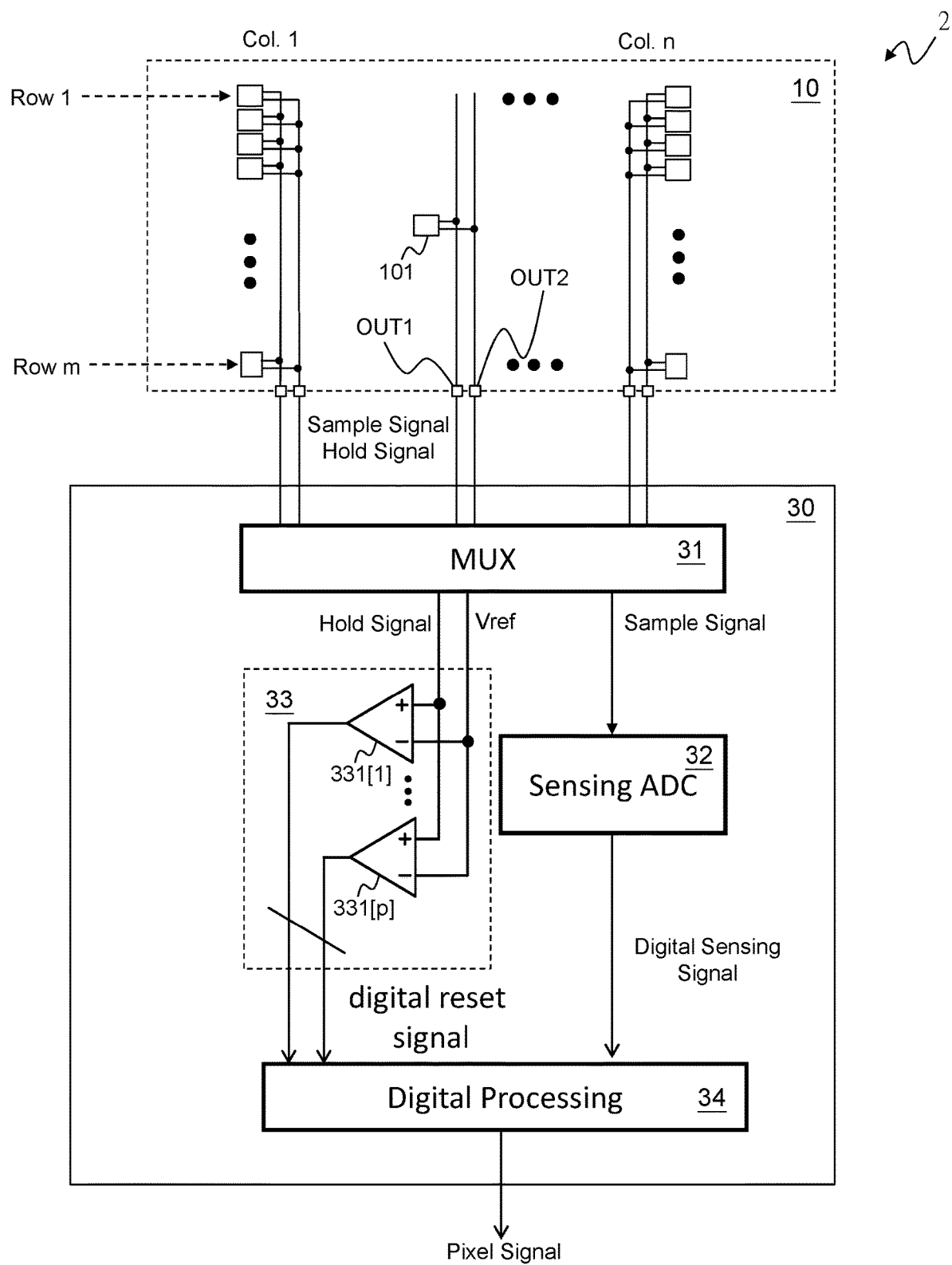
FIG. 4 shows a schematic diagram of a third embodiment according to the present invention.

FIG. 4 shows a schematic diagram of a third embodiment according to the present invention. As shown in FIG. 4, the reset ADC circuit 33 includes plural comparators 331[1] to 331 [p], wherein p is a positive integer. In one preferable embodiment, the plural comparators 331[1] to 331[p] are configured to operably convert the hold signal to the digital reset signal, wherein a number of the comparators is determined by the reset range and/or the reset resolution. In one preferable embodiment, p is not larger than 20. As shown in FIG. 4, the comparators 331[1] to 331[p] generate the digital reset signal according to the hold signal and a reference voltage Vref.

Figure 5:
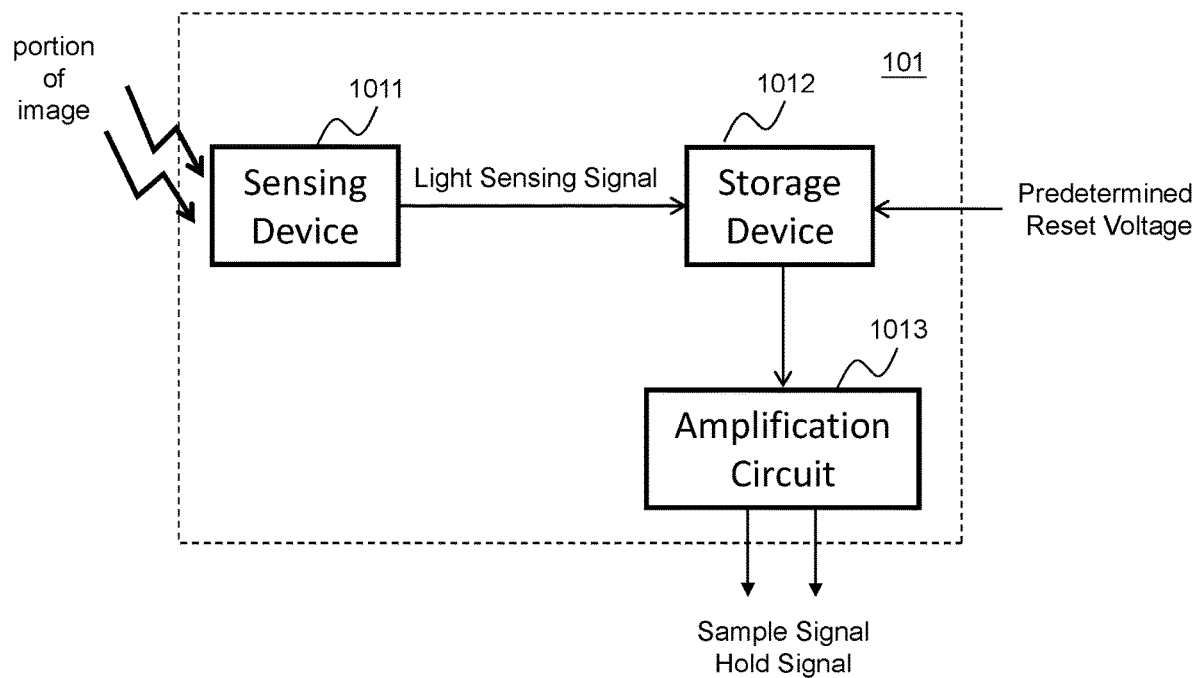
FIG. 5 shows a schematic diagram of a fourth embodiment according to the present invention.

FIG. 5 shows a schematic diagram of a fourth embodiment according to the present invention. This embodiment shows that the pixel circuit 101 includes a sensor device 1011, a storage device 1012, and an amplification circuit 1013. The sensor device 1011 senses the portion of the image and generates the light sensing signal. The sensor device 1011 is for example but not limited to a photodiode or a photo sensitive BJT (Bipolar Junction Transistor). The storage device 1012 is coupled to the sensor device 1011, and stores the light sensing signal and the predetermined reset voltage in different periods. The amplification circuit 1013 is coupled to the sensor device 1011 and the storage device 1012, and generates the sample signal and the hold signal according to the light sensing signal and the predetermined reset voltage respectively.

Figure 6:
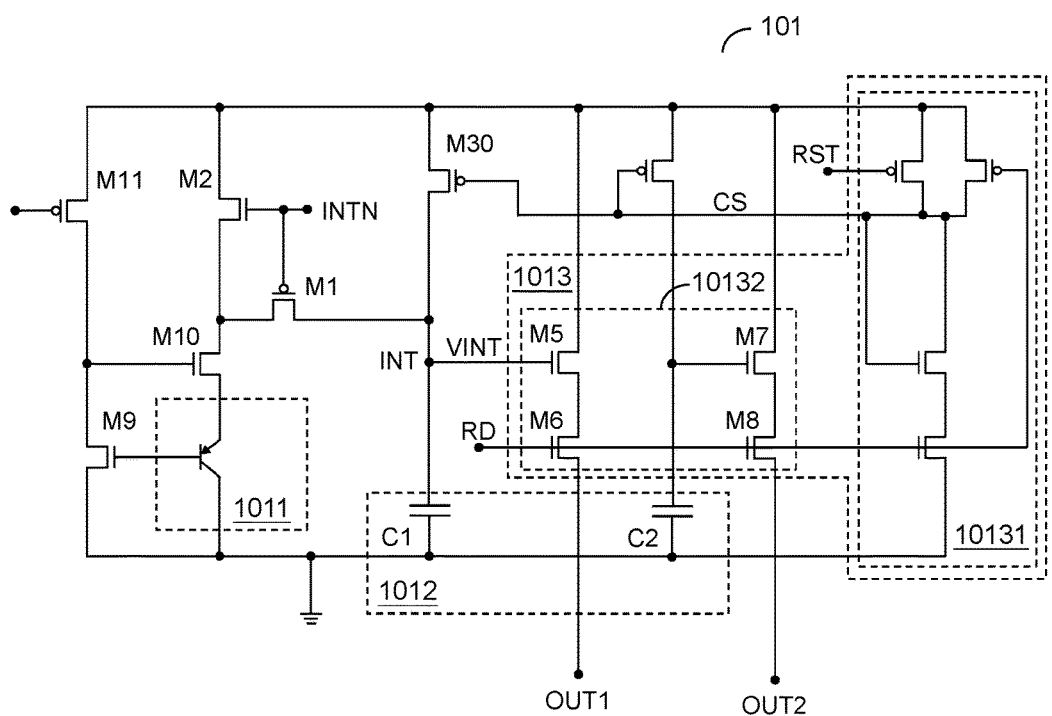
FIG. 6 shows a schematic diagram of a fifth embodiment according to the present invention.

FIG. 6 shows a schematic diagram of a fifth embodiment according to the present invention. FIG. 6 shows a more specific embodiment of the pixel circuit 101. As shown in FIG. 6, the pixel circuit 101 senses a light signal by the sensor device 1011 to generate a differential output signal between nodes OUT1 and OUT2, wherein the output signal may be the sample signal or the hold signal. Besides the sensor device 1011, the storage device 1012, and the amplification circuit 1013, the pixel circuit 101 further includes an integration switch M1, a bias switch M2, and a reset switch M30.

Figure 1A:
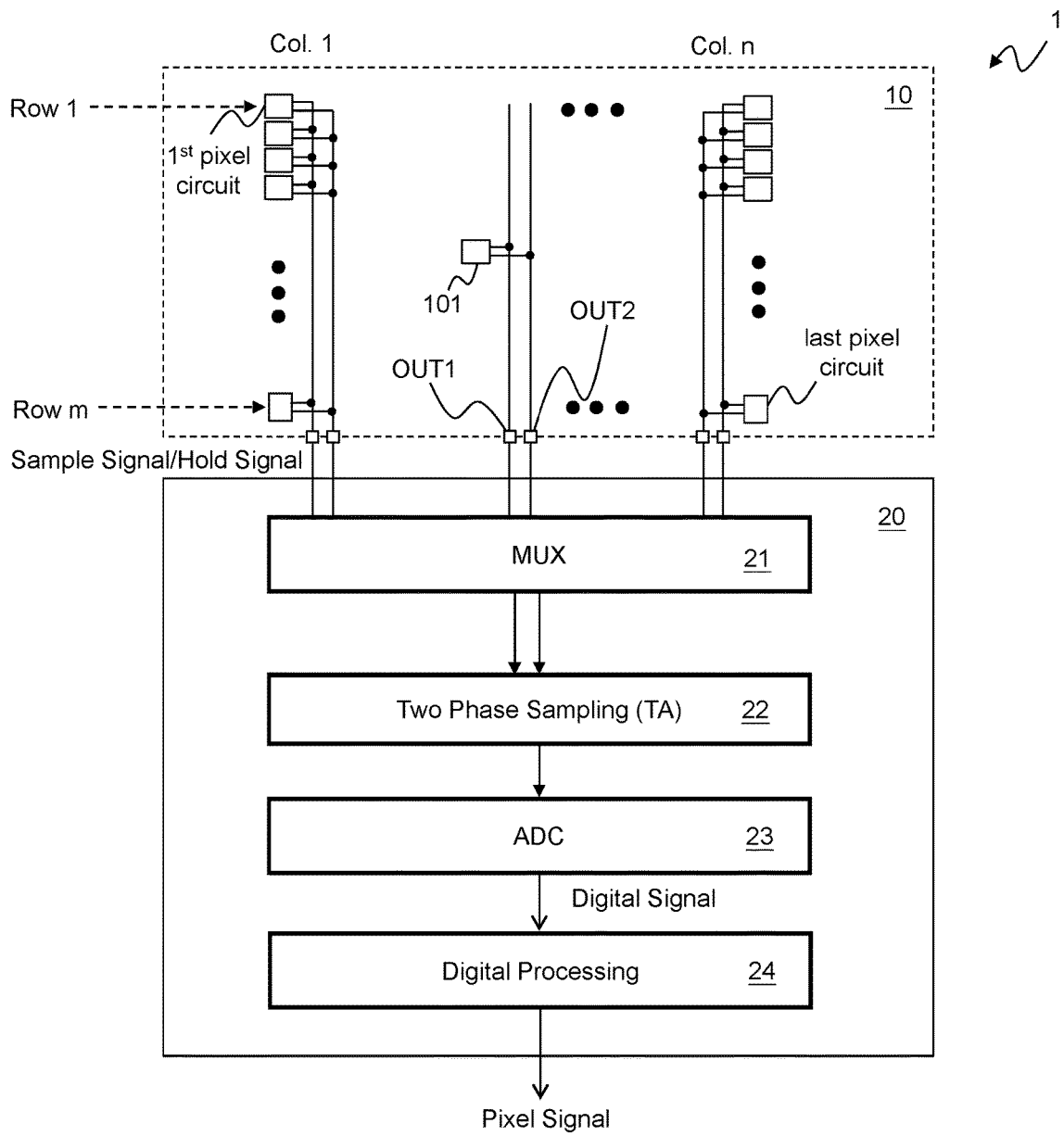
FIG. 1A shows a schematic diagram of a prior art image sensor.
Figure 1B:
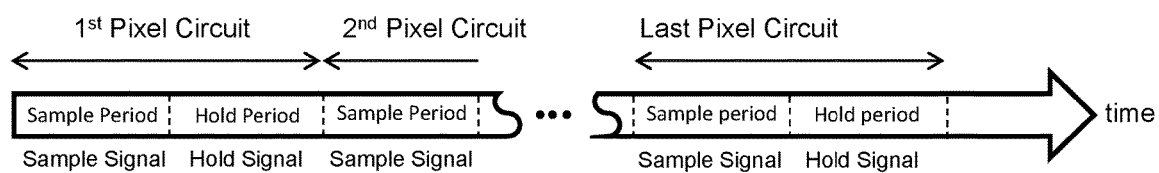
FIG. 1B is a schematic time chart showing that, the TA circuit 22 receives the sample signal in a sample period, and the hold signal in a hold period, one pixel circuit 101 by one pixel circuit 101 in turn.

As shown in the figure, the amplification circuit 1013 includes an NAND gate 10131 and a differential read-out circuit 10132. The storage device 1012 includes capacitors C1 and C2. The NAND gate 10131 generates a control signal CS for controlling the reset switch M30 according to a reset control signal RST and a read control signal RD. An inverted integration control signal INTN is generated to control the integration switch M1 and the bias switch M2. Referring to FIG. 1, in an idle time period (a time period when the pixel circuit 101 is idle), the sensor device 1011 is biased to an active state by turning on the bias switch M2, and the capacitors C1 and C2 are reset to a reset level by turning on the reset switch M30, and the integration switch M1 is off. In a shutter integration time period, the integration switch M1 is conductive and both the bias switch M2 and the reset switch M30 are off, whereby the charges stored in the capacitors C1 and C2 are discharged by the sensor device 1011 according to the intensity of the portion of the image. In a first read time period, a differential pair including M5-M8 of the read-out circuit 10132 senses the voltage on the integration node INT to determine the differential output signal as a first output level. In the second read time period, the differential pair senses the voltage on the integration node INT to determine the differential output signal as a second output level. By subtracting the first and the second output level by a transfer circuit (not shown), the output signal is generated.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. An image sensor, configured to operably capture an image, the image sensor comprising:
    an array of pixel circuits, wherein each of the pixel circuits is configured to operably sense a portion of the image, and generate a sample signal and a hold signal according to the portion of the image and a predetermined reset voltage respectively; and
    a transfer circuit, which is coupled to the array of the pixel circuits, and is configured to operably convert the sample signals and hold signals generated by the pixel circuits to corresponding digital sensing signals and corresponding digital reset signals, respectively, to generate pixel signals respectively corresponding to the pixel circuits according to the digital sensing signals and the digital reset signals;
    wherein the transfer circuit converts the sample signal generated by one of the pixel circuits to the corresponding digital sensing signal and converts the hold signal generated by another one of the pixel circuits to the corresponding digital reset signal at least partially within a same period;
    wherein the transfer circuit includes:
        a sensing analog-to-digital conversion(ADC) circuit, which is coupled to the array of the pixel circuits, and is configured to operably convert the sample signal to the digital sensing signal in a sample period;
        a reset analog-to-digital conversion(ADC) circuit, which is coupled to the array of the pixel circuits, and is configured to operably convert the hold signal to the digital reset signal in a hold period; and
        a digital processing circuit, which is coupled to the reset ADC circuit and the sensing ADC circuit, and is configured to operably generate the pixel signal according to the digital sensing signal and the digital reset signal;
        wherein the reset ADC circuit has a reset range and a reset resolution, and the sensing ADC circuit has a sensing range and a sensing resolution, wherein the reset range is less than the sensing range.

2. The image sensor circuit of claim 1, wherein the array of the pixel circuits are arranged in plural rows and columns;

wherein the sensing ADC circuit converts the sample signals to the digital sensing signals in a sequential order of the columns when the corresponding row is selected;

wherein the reset ADC circuit converts the hold signals to the digital reset signals in the sequential order of the columns when the corresponding row is selected.

3. The image sensor circuit of claim 1, wherein the reset resolution is not less than the sensing resolution.

4. The image sensor of claim 1, wherein the reset ADC circuit includes a plurality of comparators, wherein the plural comparators are configured to operably convert the hold signal to the digital reset signal, wherein a number of the comparators is determined by the reset range and/or the reset resolution.

5. The image sensor of claim 4, wherein the number of the comparators is not larger than 20.

6. The image sensor of claim 1, wherein the digital processing circuit performs a subtraction operation on the digital sensing signal and the corresponding digital reset signal to generate the pixel signal.

7. The image sensor of claim 1, wherein the pixel circuit includes:
- a sensor device, which is configured to operably sense the portion of the image and generate a light sensing signal;
- a storage device, which is coupled to the sensor device, and is configured to operably store the light sensing signal and the predetermined reset voltage; and
- an amplification circuit, which is coupled to the sensor device and the storage device, and is configured to operably generate the sample signal and the hold signal according to the light sensing signal and the predetermined reset voltage respectively.

8. A transfer circuit, which is coupled to an array of pixel circuits, wherein each of the pixel circuits is configured to operably sense a portion of an image, and generate a sample signal and a hold signal according to the portion of the image and a predetermined reset voltage respectively; the transfer circuit comprising:
- a sensing analog-to-digital conversion(ADC) circuit, which is coupled to the array of the pixel circuits, and is configured to operably convert the sample signal to a digital sensing signal in a sample period;
- a reset analog-to-digital conversion(ADC) circuit, which is coupled to the array of the pixel circuits, and is configured to operably convert the hold signal to a digital reset signal in a hold period; and
- a digital processing circuit, which is coupled to the reset ADC circuit and the sensing ADC circuit, and is configured to operably generate the pixel signal according to the digital sensing signal and the digital reset signal;

wherein the sensing ADC circuit converts the sample signal generated by one of the pixel circuits to the corresponding digital sensing signal and the reset ADC circuit converts the hold signal generated by another one of the pixel circuits to the corresponding digital reset signal at least partially within a same period;

wherein the reset ADC circuit has a reset range and a reset resolution, and the sensing ADC circuit has a sensing range and a sensing resolution, wherein the reset range is less than the sensing range.

9. The transfer circuit of claim 8, wherein the array of the pixel circuits are arranged in plural rows and columns;

wherein the sensing ADC circuit converts the sample signals to the digital sensing signals in a sequential order of the columns when the corresponding row is selected;

wherein the reset ADC circuit converts the hold signals to the digital reset signals in the sequential order of the columns when the corresponding row is selected.

10. The transfer circuit of claim 8, wherein the reset resolution is not less than the sensing resolution.

11. The transfer circuit of claim 8, wherein the reset ADC circuit includes a plurality of comparators, wherein the plural comparators are configured to operably convert the hold signal to the digital reset signal, wherein a number of the comparators is determined by the reset range and/or the reset resolution.

12. The transfer circuit of claim 11, wherein the number of the comparators is not larger than 20.

13. The transfer circuit of claim 8, wherein the digital processing circuit performs a subtraction operation on the digital sensing signal and the corresponding digital reset signal to generate the pixel signal.

14. The transfer circuit of claim 8, wherein the pixel circuit includes:
- a sensor device, which is configured to operably sense the portion of the image and generate a light sensing signal;
- a storage device, which is coupled to the sensor device, and is configured to operably store the light sensing signal and the predetermined reset voltage; and
- an amplification circuit, which is coupled to the sensor device and the storage device, and is configured to operably generate the sample signal and the hold signal according to the light sensing signal and the predetermined reset voltage respectively.

15. A transfer method of an image sensor, wherein the image sensor is configured to operably capture an image, and includes an array of pixel circuits and a transfer circuit; the transfer method comprising:
- sensing a portion of the image by each of the pixel circuits;
- generating a sample signal and a hold signal according to the portion of the image and a predetermined reset voltage respectively;
- converting the sample signals and hold signals generated by the pixel circuits to corresponding digital sensing signals and corresponding digital reset signals, respectively by the transfer circuit; and
- generating pixel signals respectively corresponding to the pixel circuits according to the digital sensing signals and the digital reset signals;

wherein the transfer circuit converts the sample signal generated by one of the pixel circuits to the corresponding digital sensing signal and converts the hold signal generated by another one of the pixel circuits to the corresponding digital reset signal at least partially within a same period;

wherein the step of converting the sample signals and hold signals generated by the pixel circuits to corresponding digital sensing signals and corresponding digital reset signals, respectively by the transfer circuit includes:
- converting the sample signal to a digital sensing signal in a sample period;
- converting the hold signal to a digital reset signal in a hold period; and
- generating the pixel signal according to the digital sensing signal and the digital reset signal;

wherein the digital reset signal includes a reset range and a reset resolution, and the digital sensing signal includes a sensing range and a sensing resolution, wherein the reset range is less than the sensing range.

16. The transfer method of claim 15, wherein the array of the pixel circuits are arranged in plural rows and columns;
   wherein the step of converting the sample signals to the digital sensing signals is performed in a sequential order of the columns when the corresponding row is selected;
   wherein the step of converting the hold signals to the digital reset signals is performed in the sequential order of the columns when the corresponding row is selected.

17. The transfer method of claim 15, wherein the reset resolution is not less than the sensing resolution.

18. The transfer method of claim 15, wherein the step of generating the pixel signal according to the digital sensing signal and the digital reset signal includes: performing a subtraction operation on the digital sensing signal and the digital reset signal to generate the pixel signal.

19. The transfer method of claim 15, wherein the pixel circuit includes:
   a sensor device, which is configured to operably sense the portion of the image and generate a light sensing signal;
   a storage device, which is coupled to the sensor device, and is configured to operably store the light sensing signal and the predetermined reset voltage; and
   an amplification circuit, which is coupled to the sensor device and the storage device, and is configured to operably generate the sample signal and the hold signal according to the light sensing signal and the predetermined reset voltage respectively.

* * * * *